(12) United States Patent
Kupratis (10) Patent No.: US 11,098,655 B2
(45) Date of Patent: Aug. 24, 2021

(54) VARIABLE MULTIPLE-DRIVE GAS TURBINE ENGINE

(71) Applicant: United Technologies Corporation, Farmington, CT (US)

(72) Inventor: Daniel Bernard Kupratis, Wallingford, CT (US)

(73) Assignee: United Technologies Corporation, Farmington, CT (US)

(*) Notice: Subject to any disclaimer, the term of this patent is extended or adjusted under 35 U.S.C. 154(b) by 183 days.

(21) Appl. No.: 16/380,605

(22) Filed: Apr. 10, 2019

(65) Prior Publication Data

US 2020/0325829 A1    Oct. 15, 2020

(51) Int. Cl.
| | |
|---|---|
| F02C 7/36 | (2006.01) |
| F02C 7/268 | (2006.01) |
| F02C 7/32 | (2006.01) |
| F16D 41/06 | (2006.01) |

(52) U.S. Cl.
CPC ............... *F02C 7/36* (2013.01); *F02C 7/268* (2013.01); *F02C 7/32* (2013.01); *F16D 41/06* (2013.01)

(58) Field of Classification Search
CPC .... F02C 7/32; F02C 7/36; F02C 7/268; F01D 15/10; F01D 15/12; B64D 35/00; F16D 41/06; F16D 41/0601
See application file for complete search history.

(56) References Cited

U.S. PATENT DOCUMENTS

| | | | | |
|---|---|---|---|---|
| 8,324,746 | B2* | 12/2012 | Bradbrook | F02C 7/32 290/1 A |
| 2010/0217779 | A1 | 9/2010 | Bradbrook | |
| 2014/0283519 | A1 | 9/2014 | Mariotta et al. | |
| 2016/0097328 | A1* | 4/2016 | Wintgens | F02C 7/32 415/1 |
| 2017/0321601 | A1 | 11/2017 | LaFargue | |
| 2018/0118364 | A1 | 5/2018 | Golshany et al. | |
| 2018/0328289 | A1* | 11/2018 | Madge | F02C 7/36 |

FOREIGN PATENT DOCUMENTS

| | | |
|---|---|---|
| DE | 102015226836 A1 | 7/2017 |
| EP | 3335995 A1 | 6/2018 |
| EP | 3444505 A1 | 2/2019 |
| EP | 3656997 A1 | 5/2020 |
| WO | WO2017/203155 A1 | 11/2017 |

OTHER PUBLICATIONS

Extended European Search Report for EP Application No. 20168948.6, dated Sep. 7, 2020, 10 pages.

\* cited by examiner

*Primary Examiner* — Woody A Lee, Jr.
*Assistant Examiner* — Maxime M Adjagbe
(74) *Attorney, Agent, or Firm* — Kinney & Lange, P.A.

(57) ABSTRACT

A gas turbine engine includes an engine spool with a turbine section, a propeller, a motor, and a variable drive arrangement. The variable drive arrangement mechanically couples the engine spool to the propeller, and includes a first gear connection rotationally coupled to the propeller, a second gear connection rotationally coupled to the engine spool, and a sprag clutch rotationally coupled to the first gear connection. The sprag clutch is configured to passively decouple the motor from the first gear connection when a torque input from the engine spool exceeds a torque input from the motor, and is configured to passively couple the motor to the first gear connection when the torque input from motor exceeds a torque input from the engine spool.

20 Claims, 6 Drawing Sheets

VARIABLE MULTIPLE-DRIVE GAS TURBINE ENGINE

BACKGROUND

The present invention relates generally to gas turbine engine architecture, and more particularly to a drive architecture for a hybrid electrical gas turbine engine.

Some emerging designs for next generation gas turbine engines in aerospace applications include hybrid-electric architectures. These architectures incorporate motors, generators, and/or hybrid motor/generators to redistribute power between engine sections, or between separate engines in multi-engine systems. Such redistribution of power can improve operating efficiencies, extend or match part lifetimes (e.g. by redistributing loads), and provide fallback power to components in the event of faults, among other functions. Alongside these advantages, however, generators, motors, and drive elements (clutches, gears) all contribute to engine complexity, mass, and expense.

SUMMARY

In one aspect, the present disclosure is directed toward a gas turbine engine including an engine spool with a turbine section, a propeller, a motor, and a variable drive arrangement. The variable drive arrangement mechanically couples the engine spool to the propeller, and includes a first gear connection rotationally coupled to the propeller, a second gear connection rotationally coupled to the engine spool, and a sprag clutch rotationally coupled to the first gear connection. The sprag clutch is configured to passively decouple the motor from the first gear connection when a torque input from the engine spool exceeds a torque input from the motor, and is configured to passively couple the motor to the first gear connection when the torque input from motor exceeds a torque input from the engine spool.

In another embodiment, the present disclosure is directed to a variable drive arrangement for a gas turbine engine. The variable drive arrangement includes a variable drive gearbox, with first and second gear connections, and a first clutch. The variable drive gearbox mechanically couples an engine spool of the gas turbine engine to a torque load. The first gear connection is rotationally coupled to the torque load, and the second gear connection is rotationally coupled to the engine spool. The first clutch is rotationally coupled to the first gear connection and mono-directionally rotationally coupled to the motor, such the first clutch passively mechanically decouples the motor from the first gear connection when the motor is incapable of driving the torque load, but passively mechanically couples the motor to the first gear connection when the motor is capable of driving the torque load.

In still another embodiment, the present disclosure is directed to a gas turbine engine including an engine spool, a propeller, a motor, and a means for variable drive distribution. The engine spool includes a turbine section, and the means for variable drive distribution is configured to passively couple the motor to the propeller.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure provides several variable drive arrangements for hybrid-electric gas turbine engines whereby motors and generators can be coupled to an engine low spool via sprag clutches. These variable drive arrangements provide load paths to enable hybrid power distribution with relatively little added mass or drivetrain complexity.

Figure 1:
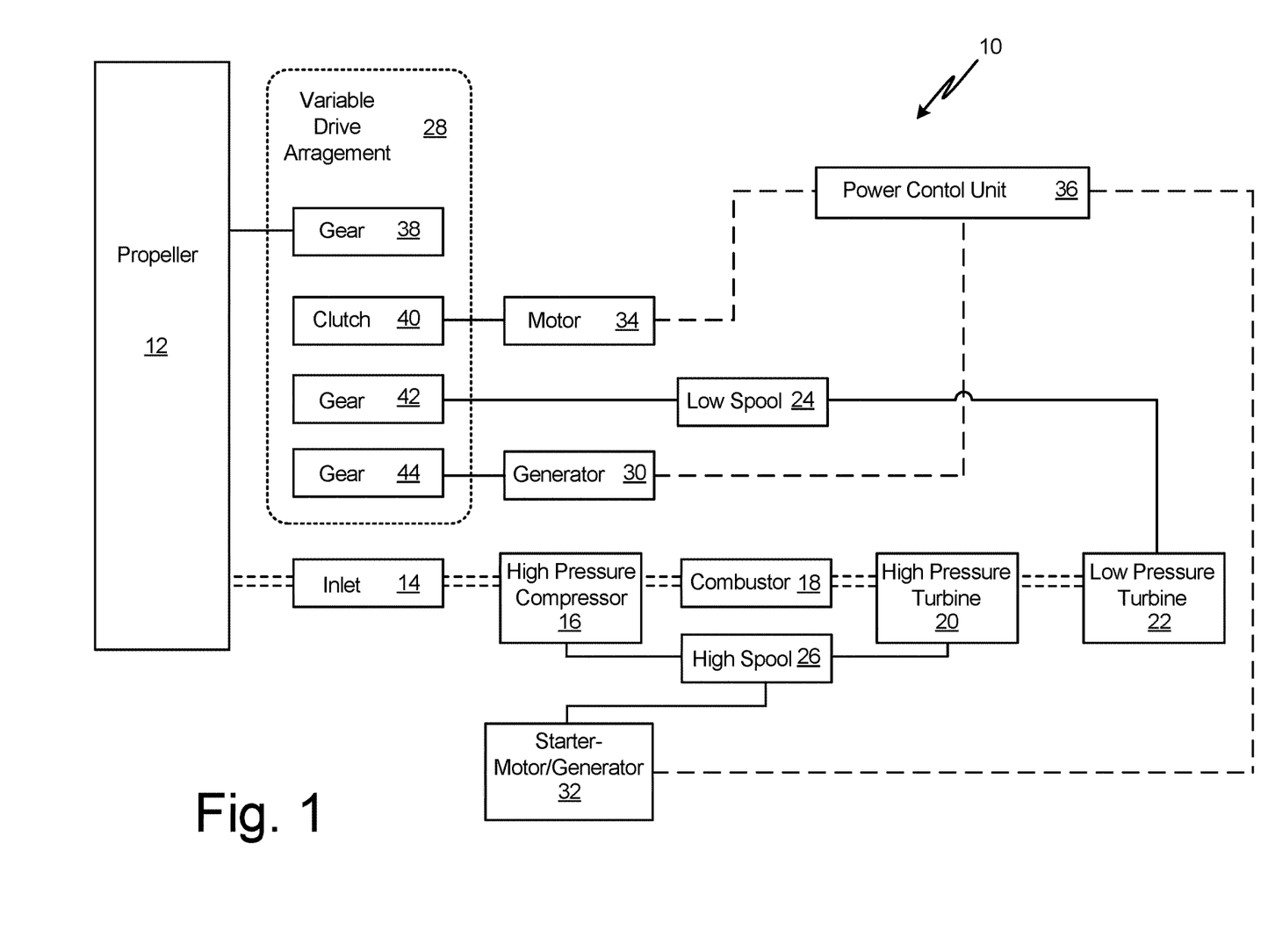
FIG. 1 is schematic architecture diagram of a first gas turbine engine, illustrating a drive system.

FIG. 1 is schematic architecture diagram of a gas turbine engine 10. In the illustrated embodiment gas turbine engine 10 can be a hybrid-electric aeroengine such as for a propjet. In other embodiments, gas turbine engine 10 can for example be a turbojet or other type of gas turbine system. FIG. 1 illustrates, in flow series: propeller 12, inlet 14, high pressure compressor (HPC) 16, combustor 18, high pressure turbine (HPT) 20, and low pressure turbine (LPT) 22. LPT 22 is an element of low spool 24, which can include a plurality of other components mechanically coupled together (i.e. rotationally fixed with respect to each other) and including a common low pressure shaft (not separately shown). HPC 16 and HPT 20 are elements of high spool 26, which can similarly include a plurality of other components all mechanically coupled together (i.e. rotationally fixed with respect to each other), and including a common high pressure shaft (not separately shown). Low spool 24 is coupled to propeller 12 via variable drive arrangement 28, to drive propeller 12.

Gas turbine engine 10 is a hybrid system including generator 30, starter motor/generator 32, and motor 34, all of which are electrically coupled to power control unit 36. Power control unit 36 includes both logic and power conditioning electronics, and controls and distributes power between electrical components of gas turbine engine 10, including but not limited to generator 30, starter motor/generator 32, and motor 34, as shown. Although power control unit 36 is illustrated as a single schematic element, some embodiments of gas turbine engine 10 can distribute the functions of power control unit 36 across multiple locations and/or components. Logic elements of power control unit 36 can be integrated with general engine controls.

Generator 30 is an electrical generator coupled to low spool 24 via variable drive arrangement 28 to extract power from low spool 24. Starter motor/generator 32 is a hybrid motor/generator disposed to boost high spool 26 during engine startup, and to draw power from high spool 26 during ordinary operation or shutdown to power other components of gas turbine engine 10, including motor 34 (driving propeller 12 via variable drive arrangement 28), or other systems. Generator 30 and/or starter motor/generator 32 can, in some embodiments, serve as regenerative electromechanical brakes to low spool 24 and high spool 26, respectively. Generator 30 is coupled to low spool 24 and propeller 12 via variable drive arrangement, but mechanically decoupled from motor 34 despite both generator 30 and motor 34 being rotationally coupled to variable drive arrangement 28. Generator 30 can boost low spool 24 when powered by power control unit 36, e.g. with electrical power from starter motor/generator 32.

Variable drive arrangement 28 includes a sequential train of gearing elements: gear 38, clutch 40, gear 42, and gear 44. Although gears 38, 42, and 44 are described and illustrated as unitary schematic elements, each may in fact comprise a plurality of separate elements, e.g. a reduction gear train or other gear assembly. Clutch 40 is a sprag clutch, as described in greater detail below with respect to FIG. 2. Gear 44 engages gear 42 to transmit torque between low spool 24 and generator 30, and can be disengaged (i.e. decoupled) from generator 30 either electrically or mechanically when generator 30 is not in use. Clutch 40 engages gear 42 and gear 38 to transmit torque between propeller 12 and low spool 24. Clutch 40 additionally provides a monodirectional coupling to motor 34, such that motor 34 is only coupled to gears 38, 42 when motor 34 is capable of driving gear 38, and not the reverse. Thus, variable drive arrangement 28 permits 40 to persistently couple gear 38 to gear 42, but to only couple either gear to motor 34 when motor 34 is capable of driving propeller 12. When motor 34 is not driving propeller 12, clutch 40 passively decouples motor 34 from propeller 12.

Figure 2:
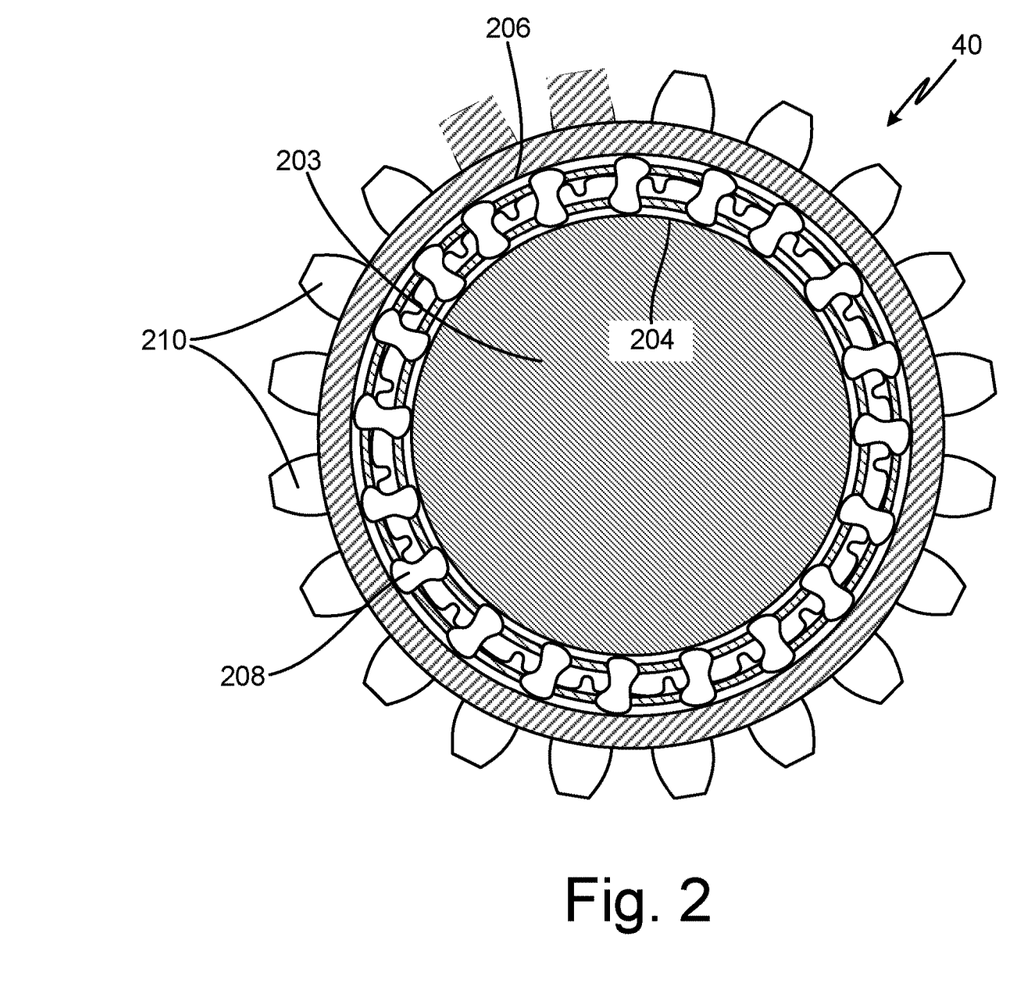
FIG. 2 is a simplified cross-sectional view of a sprag clutch.

FIG. 2 is a simplified cross-sectional view of clutch 40, with shaft 202, inner surface 204, outer surface 206, dogbones 208, and gear tooth ring 210. As noted above, clutch 40 is a sprag clutch. Inner surface 204 defines the outside of shaft 202, and abuts dogbones 208. Dogbones 208 also abut outer surface 206, which defines the inside of gear tooth ring 210. As is conventional for a sprag clutch, clutch 40 permits shaft 202 to spin freely with respect to gear tooth ring 210 in one direction (counter-clockwise, in the illustrated embodiment), but rotationally couples shaft 202 to gear tooth ring 210 when shaft 202 rotates in the opposite direction with respect to gear tooth ring 210 (clockwise, in the illustrated embodiment). Specifically, dogbones 208 are angled to transmit load between gear tooth ring 210 and shaft 202 only in one direction, and to act as bearings promoting free rotation between gear tooth ring 210 and shaft 202 in the opposite direction.

Because clutch 40 transmits torque between shaft 202 (coupled in this instance to motor 34) and gear tooth ring 210 (coupled here to gears 38, 42) only when shaft 202 experiences torque imparting clockwise rotation with respect to gear tooth ring 210, motor 34 is only rotationally coupled to gears 38, 42 when the rotational speed of inner surface 204 from motor 34 exceeds the rotational speed of outer surface 206 as driven by low spool 24/propeller 12.

Figure 3:
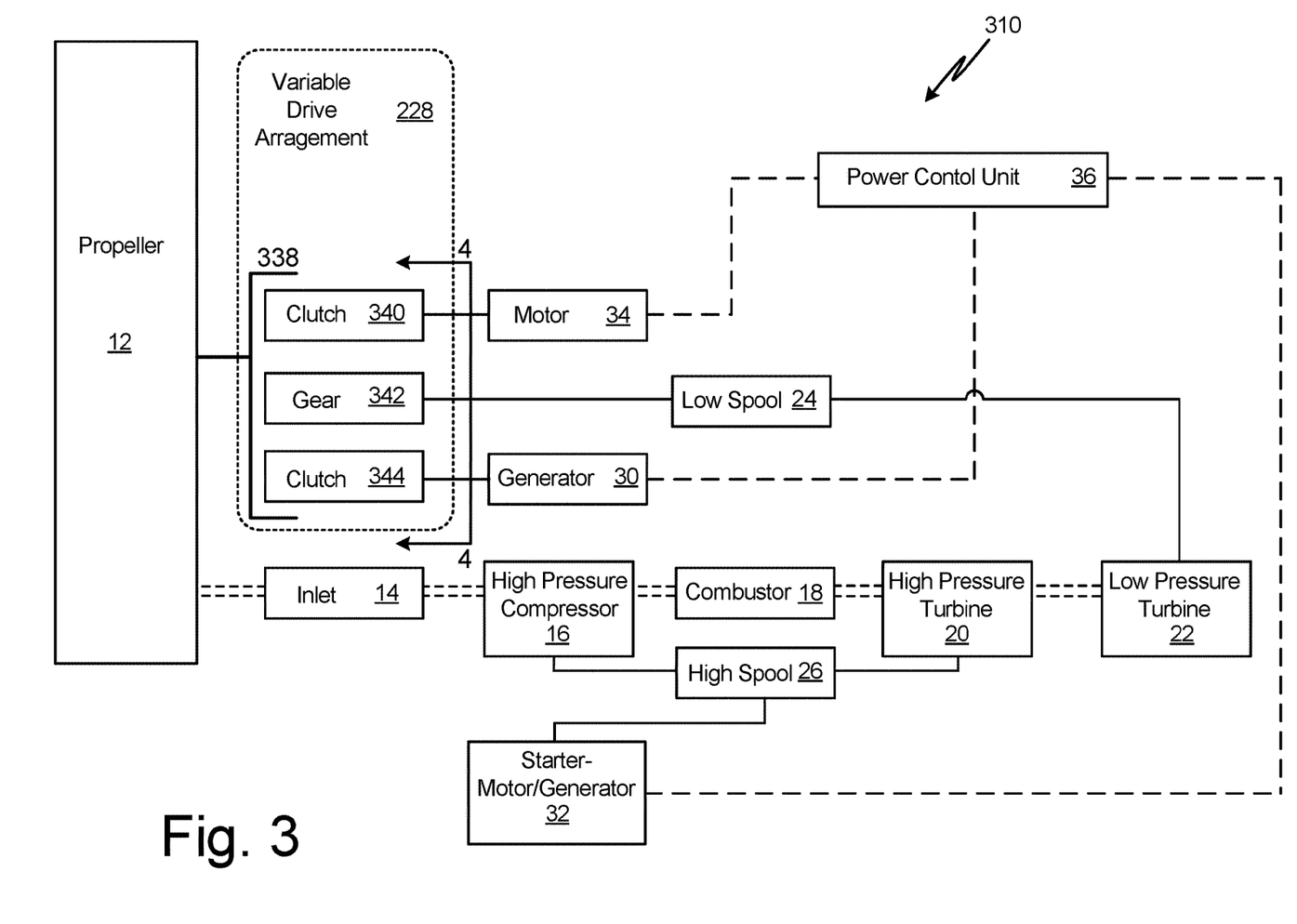
FIG. 3 is a schematic architecture diagram of another gas turbine engine, illustrating an alternative drive system.

FIG. 3 is a schematic architecture diagram of gas turbine engine 310, an alternative to gas turbine engine 10. Gas turbine engine 310 can be substantially identical to gas turbine engine 10 except with regard variable drive arrangement 328, which takes the place of variable drive arrangement 28 of gas turbine engine 10. Variable drive arrangement 328 is separately schematically illustrated in FIG. 4 (following section line 4-4 as shown in FIG. 3), and includes ring gear 338, motor clutch 340, gear 342, and generator clutch 344.

Figure 4:
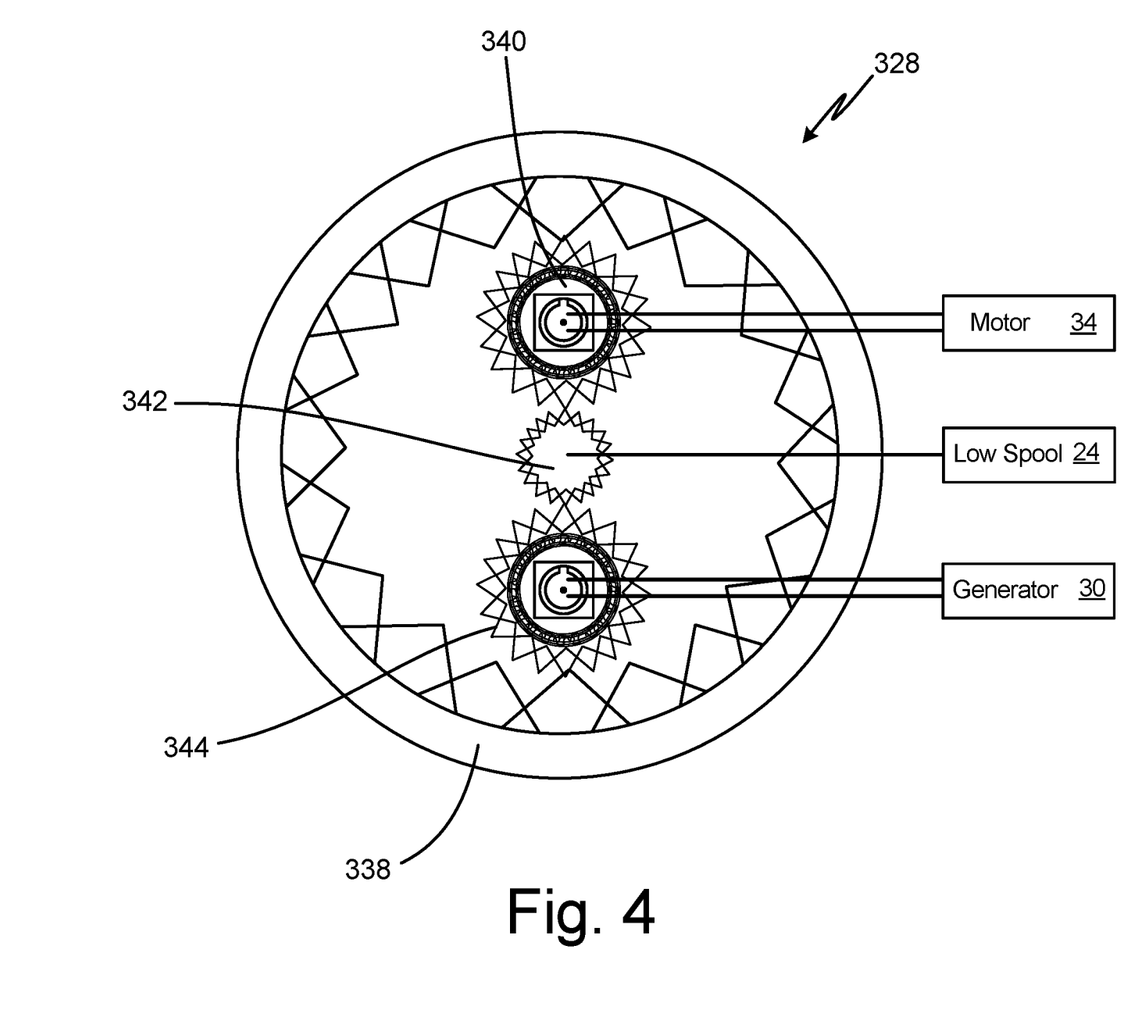
FIG. 4 is a schematic view of an epicyclic gear system within the alternative drive system of FIG. 3.

Gas turbine engine system 310 operates generally as described above with respect to gas turbine engine 10. Variable drive arrangement 328 performs substantially the same function as variable drive arrangement 28, but via different architecture. Specifically, as illustrated in FIGS. 3 and 4, variable drive arrangement 328 is an epicyclic gear arrangement with central sun gear 342 connected to low spool 24, and outer ring gear 338 connected (potentially by intervening reduction gears) to propeller 12. Motor clutch 340 and generator clutch 344 are disposed as planetary elements between and engaged with sun gear 342 and ring gear 338. Motor clutch 340 is a sprag clutch, substantially as described above. Generator clutch 344 is also a sprag clutch of the same general form, but with opposite bias—that is, disposed to engaged only when the movement of sun gear 342 relative to ring gear 338 is in the opposite direction. Thus, variable drive arrangement 338 permits generator 30 and motor 34 to be coupled to low spool 24 and propeller 12 passively, completing load paths to generator 30 and from motor 34 conditionally, to permit power to be extracted from or provided to low spool 24/propeller 12, respectively. Separately actuated electrical or mechanical couplings (not shown) can also be used to selectively decouple generator 30 and/or motor 34 under circumstances wherein sprag clutches 340, 344 would otherwise provide an active coupling. Variable drive arrangement 328 performs much the same function as variable drive arrangement 28, but with the additional benefits of potentially simpler, lighter, and more compact gearing, and of passive operability with respect to generator clutch 344, which replaces gear 44 of variable drive arrangement 28

Figure 5:
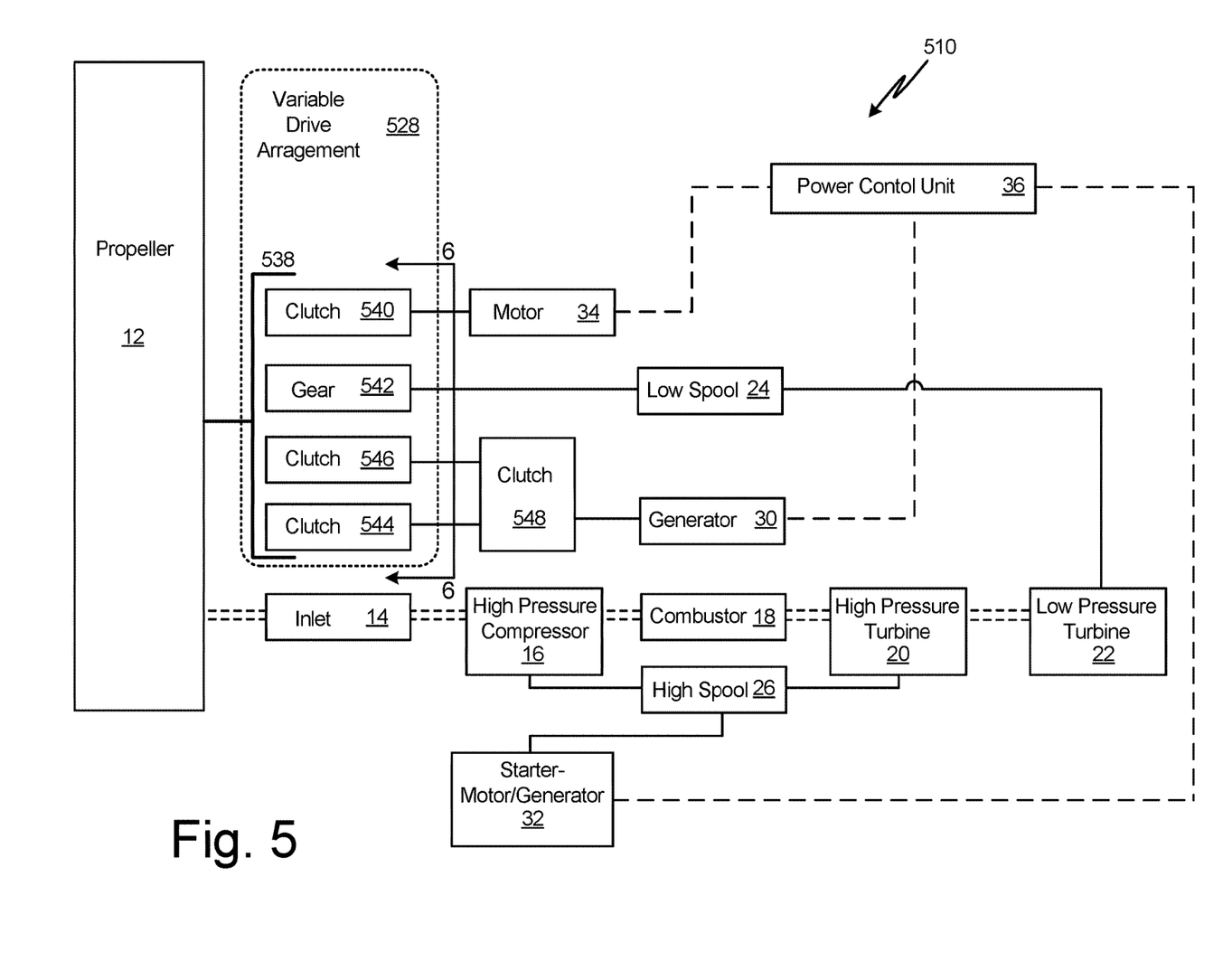
FIG. 5 is a schematic architecture diagram of yet another gas turbine engine, illustrating an further alternative drive system.
Figure 6:
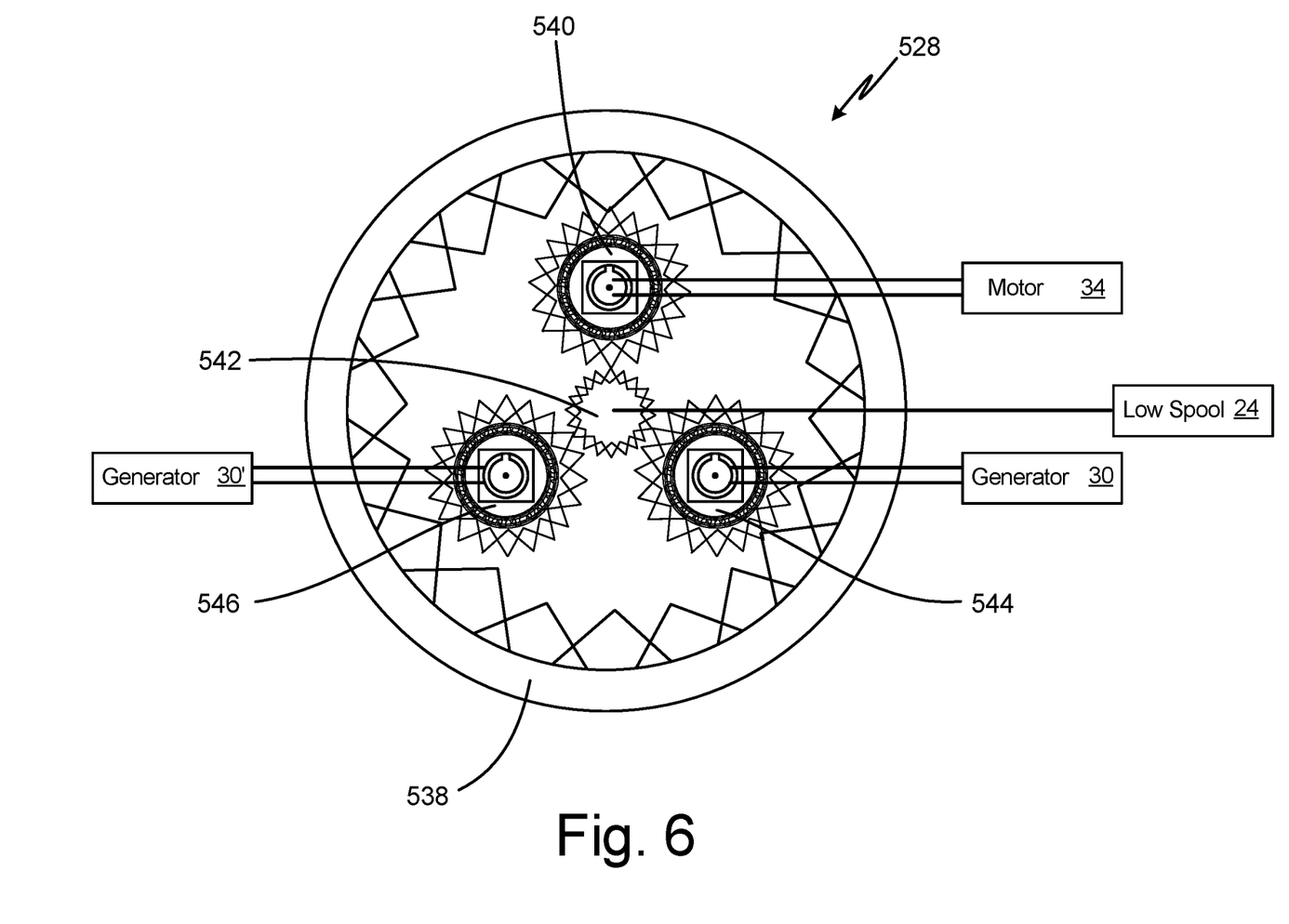
FIG. 6 is a schematic view of an epicyclic gear system compatible with the further alternative drive system of FIG. 5.

FIG. 5 is a schematic architecture diagram of gas turbine engine 510, an alternative to gas turbine engines 10 and 310. Gas turbine engine 510 can be substantially identical to gas turbine engine 310 except with regard variable drive arrangement 528, which takes the place of variable drive arrangement 328 of gas turbine engine 310. Variable drive arrangement 528 is separately schematically illustrated in FIG. 6 (following section line 6-6 as shown in FIG. 5), and includes ring gear 538, motor clutch 540, sun gear 542, and generator clutches 544 and 546. Variable drive arrangement 528 is substantially similar to the epicyclic structure of variable drive arrangement 328 (described above with respect to FIGS. 3, 4), but with additional generator clutch 546 serving as a further planetary element disposed between and engaged with ring gear 538 and sun gear 542. Generator clutch 546 operates substantially identically to generator clutch 544 (and generator clutch 344), but is biased oppositely—that is, disposed to engage during rotation in the same direction as motor clutch 34. By including two oppositely-biased generator clutches 544, 546, variable drive arrangement 528 is able to extract energy to drive a generator regardless of the relative speeds of propeller 12 and low spool 24. In FIG. 5, both generator clutches 544 and 546 are illustrated as connecting to generator 30 via intermediate clutch 548, which can in some embodiments be a further component of variable drive arrangement 528. Intermediate clutch 548 normalizes the direction of torque on generator 30, regardless of source. In alternative embodiments, intermediate clutch 548 can be omitted in favor of connecting each generator clutch 544, 546 to a separate generator 30, 30', respectively, as schematically illustrated in FIG. 6.

The gear elements illustrated in FIGS. 1-6 are not intended to be exhaustive. Further gearing can be included to transmit torque to other elements not discussed herein.

In all of the embodiments discussed herein, variable drive arrangements 28/328/528 allow low spool 24 and propeller 12 to be coupled to motor 34 and generator 30 (or generators 30, 30') via a compact sprag clutch arrangement that engages or disengages the motor and generator at least partially passively, thereby providing an efficient variable drive mechanism for a hybrid-electric engine.

DISCUSSION OF POSSIBLE EMBODIMENTS

The following are non-exclusive descriptions of possible embodiments of the present invention.

A gas turbine engine comprising: an engine spool with a turbine section; a propeller; a motor; and a variable drive gearbox configured to mechanically couple the engine spool and the motor to the propeller, the variable drive arrangement comprising: a first gear connection rotationally coupled to the propeller; a second gear connection rotationally coupled to the engine spool; and a first clutch rotationally coupled to the first gear connection and mono-directionally rotationally coupled to the motor, such that the clutch is configured to passively decouple the motor from the first gear connection when a torque input from the engine spool exceeds a torque input from the motor, and is configured to passively couple the motor to the first gear connection when the torque input from motor exceeds a torque input from the engine spool.

The gas turbine engine of the preceding paragraph can optionally include, additionally and/or alternatively, any one or more of the following features, configurations and/or additional components:

A further embodiment of the foregoing gas turbine engine, further comprising: a power control unit disposed to control and route power to the motor; and a first generator disposed to provide electrical power to the power control unit; wherein the variable drive gearbox further comprises a third gear connection disposed to mechanically couple the engine spool to the first generator via engagement of the third gear connection with the second gear connection.

A further embodiment of the foregoing gas turbine engine, wherein the first clutch is a sprag clutch.

A further embodiment of the foregoing gas turbine engine, wherein the engine spool is a low pressure spool, and the turbine section is a low pressure spool, the gas turbine engine further comprising: a high pressure spool with a high pressure compressor and a high pressure turbine upstream of the low pressure turbine; a starter generator mechanically coupled to the high spool, and electrically coupled to the power control unit.

A further embodiment of the foregoing gas turbine engine, wherein the gas turbine engine is a propjet engine, and the propeller is a propjet propeller disposed upstream of an inlet to the high pressure compressor.

A further embodiment of the foregoing gas turbine engine, wherein the variable drive gearbox is a sequential gear train comprising, in order, the first gear connection, the first clutch, the second gear connection, and the third gear connection.

A further embodiment of the foregoing gas turbine engine, wherein: the variable drive gearbox is an epicyclic gear assembly; the first gear connection comprises a ring gear, the second gear connection comprises a sun gear, the third gear connection comprises a second clutch rotationally biased opposite to the first clutch; and wherein the first and second clutches are disposed as a set of planet gears engaged with and between the first and second gear connections.

A further embodiment of the foregoing gas turbine engine, wherein the variable drive gearbox further comprises: an intermediate clutch disposed between the second clutch and the first generator; a third clutch disposed as a planet gear engaged with and between the first and second gear connections, rotationally biased opposite to the second clutch, and disposed to mechanically couple the engine spool to the intermediate clutch via engagement of the third clutch with the second gear connection.

A further embodiment of the foregoing gas turbine engine, wherein the variable drive arrangement further comprises: a second generator disposed to provide electrical power to the power control unit; a third clutch disposed as a planet gear engaged with and between the first and second gear connections, rotationally biased opposite to the second clutch, and disposed to mechanically couple the engine spool to the second generator.

A variable drive arrangement for a gas turbine engine, the variable drive gearbox comprising: a variable drive gearbox mechanically coupling an engine spool of the gas turbine engine to a torque load, the variable drive gearbox comprising: a first gear connection rotationally coupled to the torque load; a second gear connection rotationally coupled to the engine spool; and a first clutch rotationally coupled to the first gear connection and mono-directionally rotationally coupled to the motor, such the first clutch passively mechanically decouples the motor from the first gear connection when the motor is incapable of driving the torque load, but passively mechanically couples the motor to the first gear connection when the motor is capable of driving the torque load.

The variable drive arrangement of the preceding paragraph can optionally include, additionally and/or alternatively, any one or more of the following features, configurations and/or additional components:

A further embodiment of the foregoing variable drive arrangement, further comprising a third gear connection disposed to mechanically couple the engine spool to a first generator via engagement of the third gear connection with the second gear connection.

A further embodiment of the foregoing variable drive arrangement, wherein the first gear connection, the first clutch, the second gear connection, and the third gear connection form, in this order, a sequential gear train.

A further embodiment of the foregoing variable drive arrangement, wherein: the first gear connection comprises a ring gear, the second gear connection comprises a sun gear, the third gear connection comprises a second clutch rotationally biased opposite to the first clutch; and wherein the first and second clutches are disposed as planet gears engaged with and between the first and second gear connections.

A further embodiment of the foregoing variable drive arrangement, further comprising: an intermediate clutch disposed between the second clutch and the first generator; a third clutch disposed as a planet gear engaged with and between the first and second gear connections, rotationally biased opposite to the second clutch, and disposed to mechanically couple the engine spool to the intermediate clutch via engagement of the third clutch with the second gear connection.

A further embodiment of the foregoing variable drive arrangement, further comprising a third clutch disposed as a planet gear engaged with and between the first and second gear connections, rotationally biased opposite to the second clutch, and disposed to mechanically couple the engine spool to a second generator.

A gas turbine engine comprising: an engine spool with a turbine section; a propeller; a motor; and a means for variable drive distribution configured to passively couple the motor to the propeller.

The gas turbine engine of the preceding paragraph can optionally include, additionally and/or alternatively, any one or more of the following features, configurations and/or additional components:

A further embodiment of the foregoing gas turbine engine, wherein the means for variable drive distribution is a variable drive gearbox comprising:
  a first gear connection rotationally coupled to the propeller;
  a second gear connection rotationally coupled to the engine spool; and
  a clutch rotationally coupled to the first gear connection and mono-directionally rotationally coupled to the motor, such that the clutch is configured to passively decouple the motor from the first gear connection when the motor is incapable of driving the propeller, but passively couple the motor to the first gear connection when the motor is capable of driving the propeller.

A further embodiment of the foregoing gas turbine engine, wherein the clutch is a sprag clutch.

A further embodiment of the foregoing gas turbine engine, wherein the variable drive gearbox comprises an epicyclic gear arrangement including the first gear connection, the second gear connection, and the sprag clutch.

A further embodiment of the foregoing gas turbine engine, wherein the first gear connection comprises a ring gear of the epicyclic gear arrangement, and wherein the second gear connection comprises a second sprag clutch.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
  an engine spool with a turbine section;
  a propeller;
  a motor; and
  a variable drive arrangement configured to mechanically couple the engine spool and the motor to the propeller, the variable drive arrangement comprising:
    a first gear connection rotationally coupled to the propeller;
    a second gear connection rotationally coupled to the engine spool; and
    a first clutch rotationally coupled to the first gear connection and mono-directionally rotationally coupled to the motor, such that the clutch is configured to passively decouple the motor from the first gear connection when a torque input from the engine spool exceeds a torque input from the motor, and is configured to passively couple the motor to the first gear connection when the torque input from motor exceeds a torque input from the engine spool.

2. The gas turbine engine of claim 1, further comprising:
  a power control unit disposed to control and route power to the motor; and
  a first generator disposed to provide electrical power to the power control unit;
  wherein the variable drive gearbox further comprises a third gear connection disposed to mechanically couple the engine spool to the first generator via engagement of the third gear connection with the second gear connection.

3. The gas turbine engine of claim 2, wherein the first clutch is a sprag clutch.

4. The gas turbine engine of claim 2, wherein the engine spool is a low pressure spool comprising a low pressure turbine, and the turbine section is a low pressure spool, the gas turbine engine further comprising:
  a high pressure spool with a high pressure compressor and a high pressure turbine upstream of the low pressure turbine;
  a starter generator mechanically coupled to the high spool, and electrically coupled to the power control unit.

5. The gas turbine engine of claim 4, wherein the gas turbine engine is a propjet engine, and the propeller is a propjet propeller disposed upstream of an inlet to the high pressure compressor.

6. The gas turbine engine of claim 2, wherein the variable drive gearbox is a sequential gear train comprising, in order, the first gear connection, the first clutch, the second gear connection, and the third gear connection.

7. The gas turbine engine of claim 2, wherein:
  the variable drive gearbox is an epicyclic gear assembly;
  the first gear connection comprises a ring gear,
  the second gear connection comprises a sun gear,
  the third gear connection comprises a second clutch rotationally biased opposite to the first clutch; and
  wherein the first and second clutches are disposed as a set of planet gears engaged with and between the first and second gear connections.

8. The gas turbine engine of claim 7, wherein the variable drive gearbox further comprises:
  an intermediate clutch disposed between the second clutch and the first generator;
  a third clutch disposed as a planet gear engaged with and between the first and second gear connections, rotationally biased opposite to the second clutch, and disposed to mechanically couple the engine spool to the intermediate clutch via engagement of the third clutch with the second gear connection.

9. The gas turbine engine of claim 7, wherein the variable drive arrangement further comprises:

a second generator disposed to provide electrical power to the power control unit;

a third clutch disposed as a planet gear engaged with and between the first and second gear connections, rotationally biased opposite to the second clutch, and disposed to mechanically couple the engine spool to the second generator.

10. A variable drive arrangement for a gas turbine engine, the variable drive gearbox comprising:

a variable drive gearbox mechanically coupling an engine spool of the gas turbine engine to a torque load, the variable drive gearbox comprising:

a first gear connection rotationally coupled to the torque load;

a second gear connection rotationally coupled to an engine spool; and a first clutch rotationally coupled to the first gear connection and mono-directionally rotationally coupled to a motor, such the first clutch passively mechanically decouples the motor from the first gear connection when the motor is incapable of driving the torque load, but passively mechanically couples the motor to the first gear connection when the motor is capable of driving the torque load.

11. The variable drive arrangement of claim 10, further comprising a third gear connection disposed to mechanically couple the engine spool to a first generator via engagement of the third gear connection with the second gear connection.

12. The variable drive arrangement of claim 11, wherein the first gear connection, the first clutch, the second gear connection, and the third gear connection form, in this order, a sequential gear train.

13. The variable drive arrangement of claim 11, wherein:
the first gear connection comprises a ring gear,
the second gear connection comprises a sun gear,
the third gear connection comprises a second clutch rotationally biased opposite to the first clutch; and
wherein the first and second clutches are disposed as planet gears engaged with and between the first and second gear connections.

14. The variable drive arrangement of claim 13, further comprising:

an intermediate clutch disposed between the second clutch and the first generator;

a third clutch disposed as a planet gear engaged with and between the first and second gear connections, rotationally biased opposite to the second clutch, and disposed to mechanically couple the engine spool to the intermediate clutch via engagement of the third clutch with the second gear connection.

15. The variable drive arrangement of claim 13, further comprising a third clutch disposed as a planet gear engaged with and between the first and second gear connections, rotationally biased opposite to the second clutch, and disposed to mechanically couple the engine spool to a second generator.

16. A gas turbine engine comprising:
an engine spool with a turbine section;
a propeller;
a motor; and
a means for variable drive distribution configured to passively couple the motor to the propeller.

17. The gas turbine engine of claim 16, wherein the means for variable drive distribution is a variable drive gearbox comprising:

a first gear connection rotationally coupled to the propeller;

a second gear connection rotationally coupled to the engine spool; and a clutch rotationally coupled to the first gear connection and mono-directionally rotationally coupled to the motor, such that the clutch is configured to passively decouple the motor from the first gear connection when the motor is incapable of driving the propeller, but passively couple the motor to the first gear connection when the motor is capable of driving the propeller.

18. The gas turbine engine of claim 17, wherein the clutch is a sprag clutch.

19. The gas turbine engine of claim 18, wherein the variable drive gearbox comprises an epicyclic gear arrangement including the first gear connection, the second gear connection, and the sprag clutch.

20. The gas turbine engine of claim 19, wherein the first gear connection comprises a ring gear of the epicyclic gear arrangement, and wherein the second gear connection comprises a second sprag clutch.

* * * * *